INVENTOR:
Robert Esnault-Pelterie

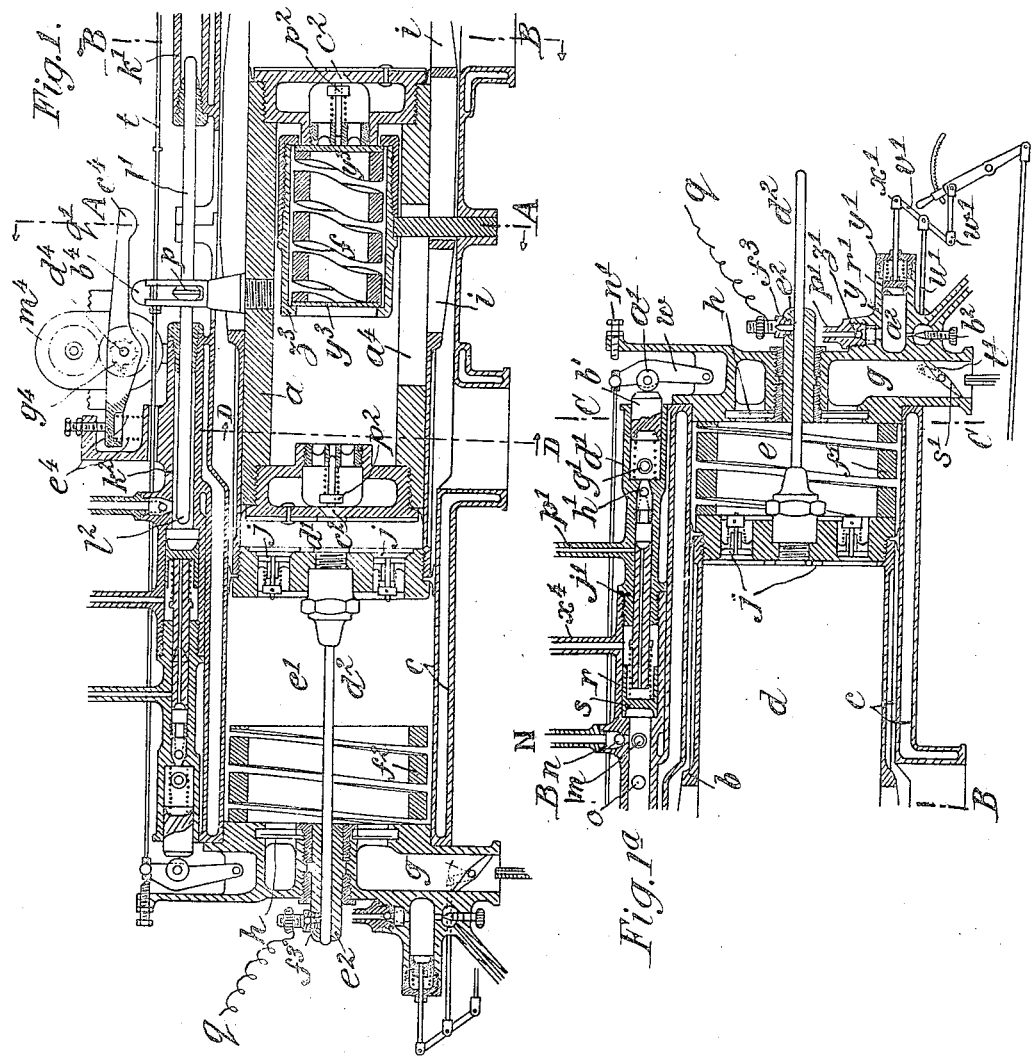

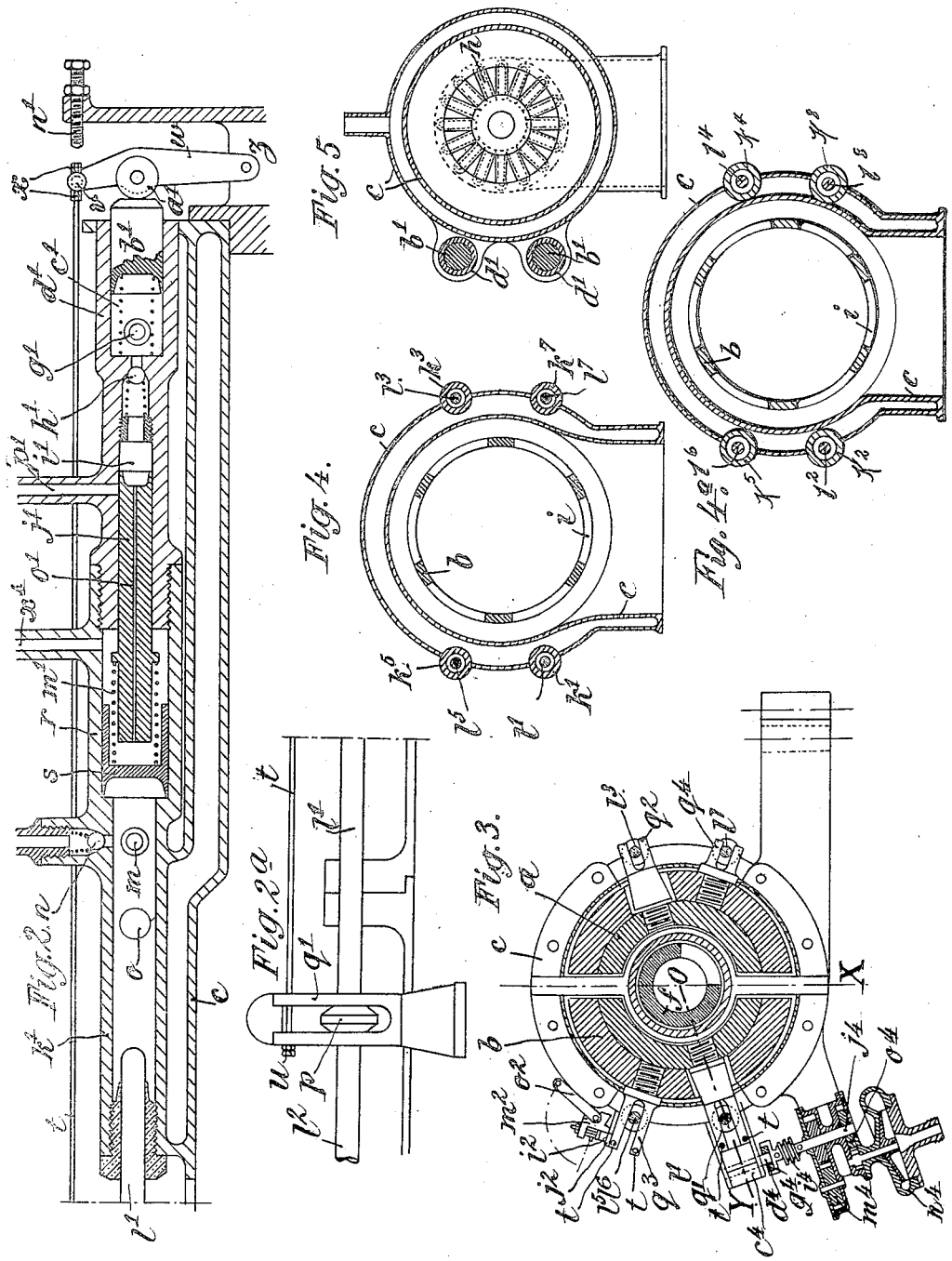

June 19, 1923.
R. ESNAULT-PELTERIE
MOTOR SYSTEM WITH DIRECT TRANSMISSION
Filed July 1, 1918   4 Sheets-Sheet 4
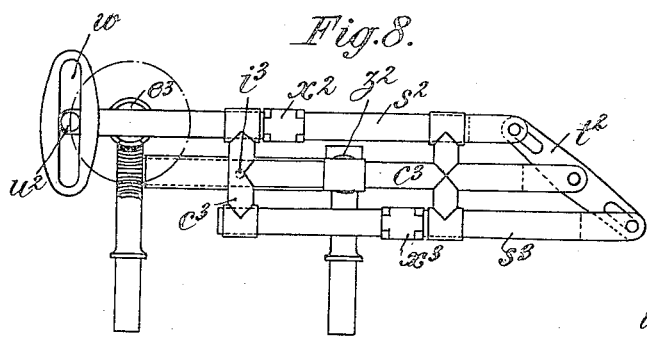
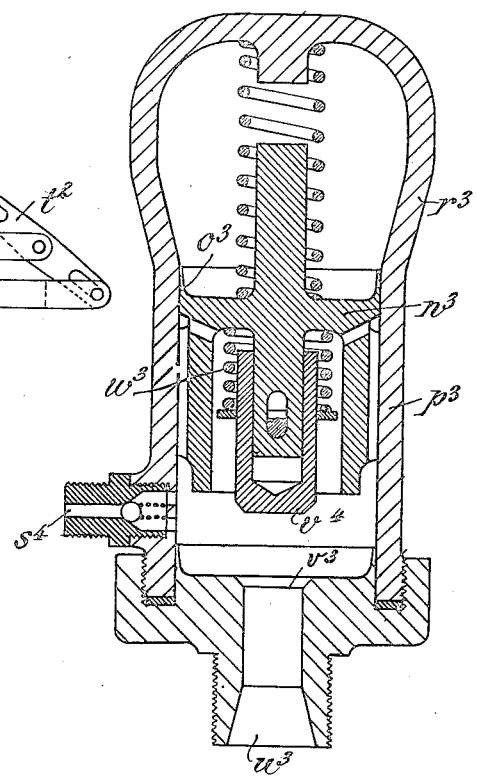
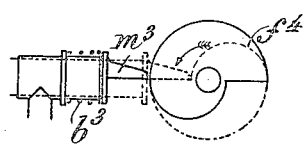
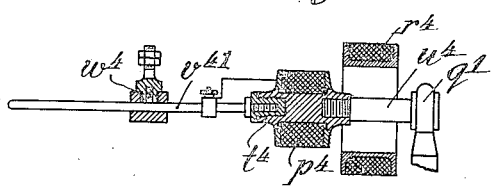
INVENTOR:
Robert Esnault-Pelterie
By Attys.
Fraser, Surk & Myers Patented June 19, 1923.

1,459,019

UNITED STATES PATENT OFFICE.

ROBERT ESNAULT-PELTERIE, OF PARIS, FRANCE.

MOTOR SYSTEM WITH DIRECT TRANSMISSION.

Application filed July 1, 1918. Serial No. 242,856.

*To all whom it may concern:*

Be it known that I, ROBERT ESNAULT-PELTERIE, a citizen of the Republic of France, residing in Paris, France, have invented certain new and useful Improvements in Motor Systems With Direct Transmissions, of which the following is a specification.

The present invention has for its object a motor system operated by gaseous liquid or pulverulent fuel with direct transmission of the power by compressed liquids or electricity in which the power is directly received from the piston or cylinder, which pistons are movable by a liquid in the first case, or a movable magnetic circuit suitably arranged in the second case.

The accompanying drawings in conjunction with the description hereafter will permit the invention to be fully understood.

Figures 1 and 1ª considered together, show a constructional form of the motor along two half sections passing through its axis and on the lines O—X and O—Y of Figure 3.

Figures 2 and 2ª, considered together, show, on a larger scale, the right hand upper part of Figure 1, Figures 3, 4 and 5 are three transverse sections passing respectively through A—A, B—B and C—C of Figure 1. The movable cylinder and the piston are supposed to be at the middle of their stroke.

Fig. 4ª is a view similar to Fig. 4, the section being on the line D, D Fig. 1.

Figures 7, 8 and 9 show respectively an end elevation, a side elevation, and a plan view of the starting arrangement for the motor according to three rectangular projections.

Figure 10 is an explanatory view of the working of this arrangement.

Figure 11 is a section of an air vessel designed to control the feed of the energy transmitting liquid.

Figure 7:
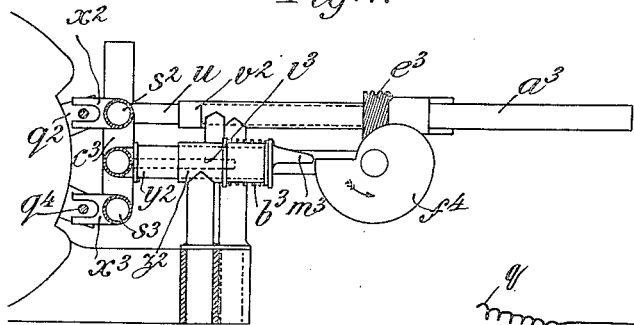

Figure 12 indicates by way of example a movable magnetic circuit for the case of electrical transmission.

The constructional form shown in Figures 1, 1ª, 2, 2ª, 3, 4, 4ª and 5 has been selected by way of example and will apply more particularly to aviation because of its great lightness; the moving parts which receive the power of the explosions are two in number, the piston $a$ and the cylinder $b$.

The said piston and cylinder move in the interior of a fixed cylinder $c$ and in opposite directions respectively.

The whole of the piston and the two cylinders fix the limits of four chambers, two of which ($d$, $d'$) serve for compression and expansion, and the other two ($e$, $e'$) serve to draw in the fresh gases and force them at each stroke into the said chambers $d$ $d'$. The motor is thus a two stroke cycle and double acting one both as regards the piston and the movable cylinder.

To ensure that the two moving parts may not, after their movements present any tendency to go more to one side than the other, in the interior of the fixed cylinder $c$, and that one of the ends of the movable cylinder $b$ shall not thus fracture the corresponding end of the fixed cylinder $c$, Belleville springs or washers $f$, $f'$, $f^2$ are arranged so as to each receive said movable parts when they happen to exceed their normal maximum stroke.

The working of the motor takes place for each of the ends in the following manner, which will be described for the right hand end only (see Figure 1ª) comprising the chambers $d$ and $e$.

The movable cylinder $b$ as it moves away from the bottom of the fixed cylinder $c$ draws in air charged with fuel coming from the carburetter or the mixer $g$. This air enters into the cavity $e$ through light automatic valves or better, by raising light spring tongues $h$ which form valves, and are arranged preferably radially around the axis of the motor, as is shown in Figures 1 and 5.

The outer free ends of these tongues $h$ have their lift limited by a small collar which serves as an abutment or stop for them.

When the movable cylinder $b$ has reached the end of its suction stroke, the said valves or tongues $h$ close automatically and the volume of gas contained in the space $e$ undergoes, during the return, a slight compression. At the moment when the double movement of the piston and the cylinder which move away from each other uncovers the exhaust ports $i$, the pressure which existed in the space $d$ owing to the preceding explosion, falls abruptly and the carburetted gases, slightly compressed in the space $e$ lift the valves $j$, enter the space $d$ and drive out in front of them the burnt and expanded gases still remaining in this latter.

When the piston and the cylinder have arrived at the point where they are farthest apart and then return in the other direction, the inertia of the valves $j$ causes them to close at once and a fresh suction is produced in the space $e$. Compression commences in the space $d$ at the moment when the movement of the piston $a$ and the cylinder $b$ towards each other causes the closing of the exhaust ports $i$.

The hydraulic pumps which effect the transformation of the energy received by the moving parts are constituted by the fixed cylinders $k'$, $k^2$, $k^3$, $k^4$, $k^5$, $k^6$, $k^7$ and $k^8$, two of which ($k'$ and $k^2$) are visible in longitudinal section in Figure 1, and four ($k'$, $k^3$, $k^5$ and $k^7$) in cross section in Figure 4. The others $k^2$, $k^4$, $k^6$ and $k^8$ are shown in cross section in Fig. 4ª.

The pistons $l'$, $l^2$, $l^3$ and $l^4$ are carried along directly by the piston $a$ and four other pistons $l^5$, $l^6$, $l^7$ and $l^8$ by the movable cylinder $b$. These pistons are attached together in pairs, $l'$ and $l^2$, $l^3$ and $l^4$, $l^5$ and $l^6$ and $l^7$ and $l^8$, each of these pairs acting in the opposite direction by its two ends.

According to the visible arrangement in Figures 1, 3, 4 and 4ª, it will be understood that on the movement of these moving parts, two pump pistons located diametrically opposite each other with respect to the axis of the said motor $l'$, and $l^3$ for example or $l^5$ and $l^7$ always work at the same time. It is necessary that the forces which they develop be equal so as not to cause any jamming of the moving parts.

To this end the two pumps of the pistons attached to the same moving part and located on the same side, such as $l'$ and $l^3$ for example, have a suction valve $m$ and a compression valve $n$ in common so that the pressure cannot in any case be unequal in the two corresponding pump barrels.

In Figures 1 and 1ª (showing only the pump barrels $k'$ and $k^2$) there can be seen in $k'$, the piston of which is at the end of its suction stroke, the opening $o$ which causes the cylinder $k'$ to communicate freely with its corresponding cylinder $k^3$ visible in section in Figure 4.

In order to avoid lateral strains, each pair of pistons carries at its centre a small collar $p$ which engages between the fingers of the bosses $q'$, $q^2$, $q^3$, $q^4$ on one of the moving parts and are carried along by the aid of these fingers, and yet have a slight amount of transverse play which allows them to centre themselves exactly in the liners of the hydraulic pumps, while yet allowing for the necessary play for working and which exists on the one hand between the piston $a$ and the cylinder $b$ and on the other hand between the cylinder $b$ and the cylinder $c$.

The four suctions of the four pairs of pumps are connected together as well as their four force mains, and the two single pipes which thus result may supply a hydraulic motor of any type serving as a receiver of energy.

The explosion motor, which forms the subject matter of this invention, is considerably different from motors of the ordinary type, and can only work with special systems of governing and starting.

As it cannot possess in the ordinary way a fly wheel capable of storing up kinetic energy much greater than that of an explosion, it requires to have two instantaneous governors acting without delay from one explosion to the other.

If it be supposed in the first place that the proportion of fuel in the air is positively determined it is possible to effect an automatic governing of the supply of the fuel under pressure in such a way as to cause it to decrease when the stroke of the moving parts exceeds the normal and to cause it to increase in the reverse direction.

To this end the two pump barrels located on the same side, the pistons of which are actuated from the same moving part, say the pump barrels $k'$ and $k^3$ for example, are connected by a passage one outlet of which is shown at $o$, Figure 2, so that they cooperate in common with a single cylinder $r$ containing a piston $s$ of such a kind that if this latter is left free, it is capable by its movement of completely annulling the effects of the movement of the pistons $l'$ and $l^3$.

It is advantageous that the said pistons have an area much greater than the sum of those of the pistons $l'$ and $l^3$ so as to have a shorter stroke than theirs.

This system has already been described in my prior French Patent No. 475582 dated the 5th March, 1914, but it necessitates, in order to be applicable to the present motor, an absolutely automatic system of control of a special kind which will now be described.

To carry out the said governing in view of the extreme position which the pistons $l'$ and $l^3$ attain in their movement, the part $q'$ which carries one of them along has at its outer part a hole the axis of which is parallel to the movement and which is traversed by a very light rod or steel wire $t$ screw threaded at one end, which carries a nut and a lock nut $u$, Fig. 2.

At its other end this rod passes loosely through a hole bored in the end of a lever $w$, this other end of the rod $t$ carrying nuts and lock nuts $x$ of such a kind that when the finger $q'$ carries along the adjacent end of the rod $t$ its other end carries along the end of the lever $w$.

Between the two ends of the lever $w$ a boss or a roller $a'$ is mounted which in its movement forces back a piston $b'$ constantly held against the said boss or roller $a'$ by the oppositely acting spring $c'$, Fig. 2.

The face of this piston $b'$ acts as the piston of a liquid pump the cylinder $d'$ being provided with an automatic inlet valve $g'$ and an automatic non-return valve $h^1$ in the usual way.

The liquid forced up by this pump into the cavity $i'$ drives back before it a piston $j'$, which serves as an abutment to the counter piston $s$ for the governing of the supply of the working pumps.

It will be understood that when the moving part which carries along the part $q'$ exceeds the limited position for which the length of the rod $t$ is adjusted, the said part $q'$ enters into contact with the nut $u$ at the end of the rod $t$, and thereby exerts a pull on the rod $t$, and sets in motion the lever $w$ and the piston $b'$.

Under these conditions, this piston $b'$ drives back a quantity of liquid which is greater the more the moving part carrying along the part $q'$ has exceeded the limited position for which the length of the rod $t$ has been adjusted.

The liquid driven back by the piston $b'$ will drive back the piston $j'$ to an extent likewise proportioned to this excess of stroke and will diminish to a greater extent the free stroke of the counter piston the more the moving part $q'$ has exceeded its limit of normal stroke.

It is obvious therefore that when one of the moving parts the part $a$ for example has exceeded this limit of normal stroke, (for example at the end of the working stroke of the pistons $l^2$ and $l^4$) it will diminish by the same amount the free stroke of the counter piston of its own pumps which are on the opposite side, ($l'$ and $l^3$ according to the above example). The working stroke which these latter furnish will thus be augmented the more the preceding extreme position has been exceeded.

It is also necessary that the working shall take place equally in the reverse direction, that is to say that when the moving part does not attain the fixed limited stroke there is automatically produced a reduction of the work absorbed in the following stroke so as to avoid the motor stopping abruptly.

To this end, the piston $j'$ is pierced with a fine hole $o'$ Fig. 2 in such a way that when the piston $s$ is not held against it the spring $m'$ will thrust it back slowly in the direction which corresponds to a greater free stroke of the piston $s$ and consequently to a lesser checking of the stroke which immediately follows a stroke which is too short.

It will thus be understood that under normal circumstances the stroke will adjust itself in such a way that each part exceeds at each stroke by a constant quantity the limited position in which the part $q'$ enters into contact with the nut $u$. This excess which is constant will be such that it will supply at each stroke to the piston $j'$ a volume equal to the volume of the liquid which has passed since the preceding stroke through the passage $o'$ and has permitted the piston $j'$ to recoil a determined quantity under the influence of the spring $m'$.

The limit of position which the moving parts attain in their movement will therefore be slightly greater than the position of contact of the bosses $q'$, $q^3$ with the nuts of the rod $t$ and the necessary adjustment will be easily made by the adjustable contact screws $n^1$ provided with lock nuts.

In order that the movements of the pistons $s$ and $j'$ may be free, the pipe $x^4$ must communicate with a reservoir not shown or a space full of liquid at a moderate pressure at least equal to that which exists in the general inlet pipes to the pumps.

The ratios between the excess of stroke of the moving parts and the corrections which have to be obtained by reason of each of them, depend naturally on the characteristics of each type of the said motor, that is to say on its power, on the masses of the moving parts, and on the flexibility of the Belleville springs or washers $f$, $f'$, $f^2$.

The determination of these ratios does not come within the scope of the invention, but the preceding explanations suffice amply to enable a person skilled in the art to easily determine, after having read them, the conditions of realization, and consequently to fix the areas and the strokes of the pistons $b'$ and $j'$ the diameter and the length of the passage $o'$ and also the ratios of the arms of the lever $w$ and the force of the spring $m'$ according to the working pressure adopted for the liquid, the viscosity of this latter, the period of the motor, etc.

It may happen that from some cause or other, the check produced by the pumps working at their proper full stroke is not sufficient to absorb all the energy produced by the explosions.

In this case, the piston $j'$ bears constantly against the piston $s$ and the moving parts continue nevertheless to exceed their limit position, causing the pistons $b'$ to act which are thus no longer able to drive back liquid through the passage $o'$ in the piston $j'$ this latter being, as hereinbefore stated constantly held against the piston $s$.

It is necessary under these conditions that a positive control should diminish the admission of the fuel and to this end the piston $j'$, when it reaches its extreme position where it strikes against the piston $s$ uncovers in the cavity $i'$ an opening $p'$ which communicates by a connection (partly broken away as shown in Figs. 1 and 1$^a$), with a cylinder $y$ (see Figure 1$^a$) containing a piston $r'$ which acts upon the admission of the fuel in the manner about to be described.

This admission is regulated at the carburetter by means of a throttle or butterfly valve $s'$ worked by a lever $t'$ attached to a rod $u'$, as conventionally illustrated in Figs. 1 and 1$^a$.

This rod is attached to the centre of a rock arm $v'$ of the ends of which $w'$ is connected to the lever or to the acceleration pedal near the driver of the motor, the other end $x'$ of the rock arm being connected to the piston $r'$ above mentioned and this piston $r'$ is subjected to the action of a spring $y'$.

The cylinder $y$ which, on the one hand is adapted to receive the liquid forced forward by the piston $b'$ through the passage $p'$ and a ball or flap valve $z'$ has on the other hand a small exhaust opening $a^2$ adjustable by a needle $b^2$, in such a way that the piston $r'$ acts exactly in the same manner as the piston $j'$ but only when this latter has arrived at the end of its stroke.

In this position (piston $j'$ in extreme forward position uncovering $p^1$), the rods $t$ and the levers $w$ act through the medium of the pistons $b'$ and $r'$ no longer to increase the supply of the liquid which remains at its maximum, but upon the admission of the fuel, reducing said admission of fuel up to the moment when the moving parts (piston $a$ and parts $q^1$ and $q^2$ for example) only exceed the limit position by an amount such that the piston $b'$ supplies at each stroke an amount of liquid equal to that which has flowed since the preceding stroke through the openings $o'$ and $a^2$ under the action of the springs $m'$ and $y'$ which thrust back the pistons $j'$ and $r'$.

It will be understood for the rest that if, in certain cases, it was desirable to make the hydraulic pumps always act with the full contents of their cylinders but at a variable pressure, it would suffice to do away with the counter piston $s$ as well as the abutment piston $j'$ and to cause the feed of the piston $b'$ to constantly act on the piston $r'$ through the passage $p'$.

It may also happen that this arrangement gets out of order; it cannot furthermore act at the first starting of the motor when the pump barrels and the pipes are still filled with air.

It is necessary therefore to prevent the pressure of the explosions from augmenting indefinitely one or the other.

To this end, each face of the piston $a$ is provided with a safety valve $c^2$ suitably weighted by the masses $p^2$.

The accelerations undergone by the moving parts of the present motor offer the peculiarity that the difference between the said accelerations and the pressure exerted at each instant by the gases upon each end of the explosion chambers is constantly directed towards these ends.

It is thus possible to cover the working faces of the piston and movable cylinder with casings which retain the heat without any fear of these becoming detached by inertia as is unavoidable in motors of the ordinary types.

As a matter of fact these latter at the moment when the piston passes to the end of its upper stroke, the acceleration of the variation of speed referred to the square centimetre may be greater than the pressure of the gases of the explosion (it is effectively so in automobile and aviation motors which rotate very rapidly) while in the present motor the moving parts obey exclusively the pressure of the gases. Similar casings are therefore in the present motor pressed against the face which they are to protect sometimes by inertia, sometimes by the pressure of the gases, and it is the application of casings which retain the heat under such conditions which is considered as one of the parts of the invention.

The present motor is designed to act normally by self ignition having regard to the considerable expansion which may be therein utilized.

In any case, it is necessary, in order that it shall attain the standard of self ignition that it be arranged so as to be able during several strokes to act by electric ignition.

To this end the end of each cylinder is traversed at its centre by an insulated rod $d^2$ fixed to the end of the movable cylinder $b$ after the manner of the internal fitting of a spark plug.

It is prolonged outwards and traverses the end of the fixed cylinder $c$ through a joint which is both gas tight and a non-conductor of electricity. This joint is formed by a socket of insulating material $e^2$ in which is seated a brush of carbon $f^3$ constantly and lightly held against the rod $d^2$ by a light spring, which is electrically connected by the wire $q$ (see Figures 1 and 6) to the secondary winding of a sparking coil $g^2$ (see Figure 6) the other pole of which is grounded.

Figure 6:
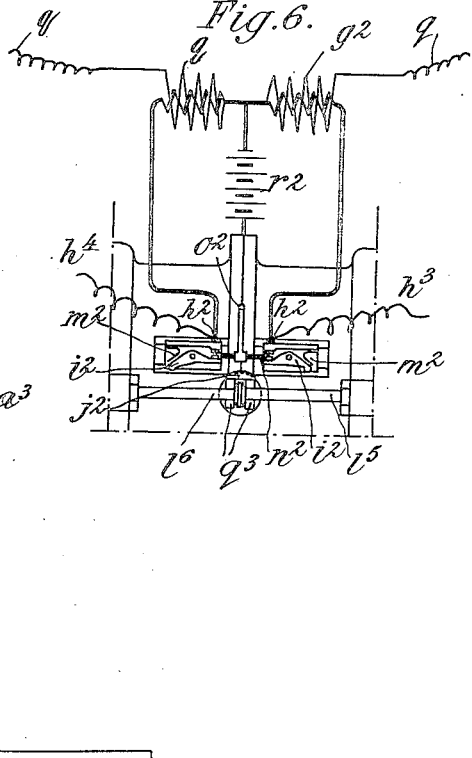
Figure 6 shows an igniting device.

It is necessary for the present motor to have a sparking coil for each end and the way in which they are connected to their interrupter is shown in Figure 6.

The primary and secondary windings of the two coils are connected to the same end of a battery of accumulators $r^2$ of which the other is grounded.

The other end of each of the primary windings returns to the platinized screw $h^2$ of its own interrupter $i^2$ which itself is grounded.

A condenser is mounted in shunt on each interrupter, in the ordinary way but is not shown in any of the figures for the purpose of not uselessly complicating them.

Each free end of the two secondary windings is taken respectively to a contact brush $f^3$ on the corresponding side.

To work the interrupters of these coils, a boss $q^3$ on one of the moving parts (the cylinder $b$ for example) carries a tappet $j^2$ and the interrupters are placed in such a way that in the vicinity of each extreme position of the part carrying the boss $q^3$, the tappet $j^2$ strikes the tail of one of the interrupters $i^2$ thus producing the rupture of the primary circuit in the coil on the corresponding side and causing ignition on this side.

To adjust the starting to the ignition, while yet preserving the symmetry of the working, each of the interrupters is mounted on a small carriage $m^2$ sliding parallel with the axis of the motor, for example in a dove-tail groove.

The carriages are drawn along longitudinally by a screw $n^2$ with inverted (right and left handed) threads, the nut of which struck lengthways is operated by the lever $o^2$ in such a way that the interrupters move constantly in opposite directions in equal quantities when the lever $o^2$ is acted upon.

It is obvious that explanations so minute are only given here in order to make the invention properly understood, which includes the numerous variations in construction applied to the said motor and which anyone skilled in the art can devise from an inspection of this very detailed description.

It has been hereinbefore stated that it was necessary to effect several electric ignitions to set the present motor going, but it is also necessary to cause it to make, at first, a certain number of strokes in order to fill it with combustible gas.

One means of producing these preparatory strokes will now be described by way of example, it being supposed that the starting is effected by hand.

During this operation of filling the ignition will have to be cut off to avoid any return of the crank; a spark will therefore have to be produced at the very moment when the moving parts are left to themselves.

Figure 9:
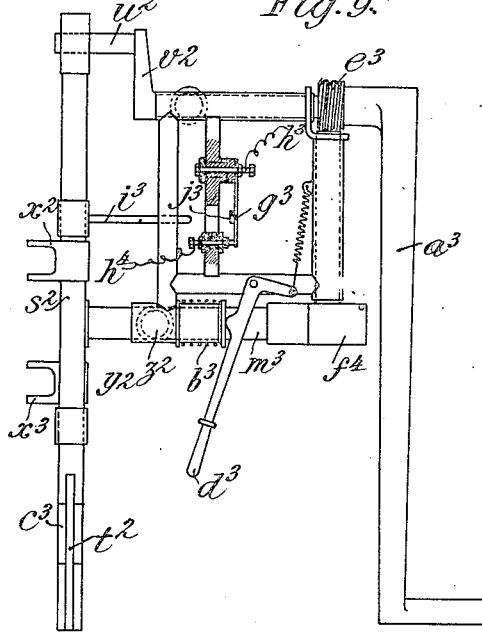

The system which permits these desiderata to be simultaneously carried out consists in arranging upon the side of the motor a light apparatus visible on three sides in Figures 7, 8 and 9.

This apparatus is composed essentially of two catches $x^2$ and $x^3$ respectively attached to two rods $s^2$ and $s^3$ which slide parallel in bearings carried by a frame $c^3$ and with a constantly reverse movement.

To carry out this movement one of the rods $s^2$ has at one of its ends a transverse slot $w$ in which works a finger $u^2$ carried by a crank $v^2$; the circular movement of this crank therefore communicates, through the medium of the slot $w$ an alternate movement to the rod $s^2$ and this latter, in its turn, causes the rod $s^3$ to move through the medium of a reversing lever $t^2$.

The frame $c^3$ is mounted upon a tube $y^2$ which may slide longitudinally inside a bearing $z^2$ the axis of which is perpendicular (at right angles) to that of the motor.

It will thus be seen that the two clutches $x^2$ and $x^3$ each surround one of the bosses $q^2$ and $q^4$ of the moving parts $a$, $b$, and communicate their alternate and inverse movements to them with a stroke equal to twice the radius of the crank $v^2$.

If this crank $v^2$ be attached to the hand-crank $a^3$, it is plain that when the clutches $x^2$ and $x^3$ are in engagement with the bosses $q^2$ and $q^4$, the movement imparted to the crank will communicate to the two moving parts $a$, $b$ simultaneous movement in opposite directions.

To release the said moving parts $a$, $b$, at the desired moment the motor-starting apparatus is arranged as will now be described.

A powerful spring $b^3$ tends constantly to separate both the frame $c^3$ and the rods $s^2$ and $s^3$ of the motor in such a way that if this spring $b^3$ were free it would prevent the clutches $x^2$ and $x^3$ from gripping the bosses $q^2$ and $q^4$.

In order to compel the clutches $x^2$ and $x^3$ to grip the bosses $q^2$ and $q^4$, a forked lever $d^3$ allows the resistance of the spring to be overcome and the clutches to be thrown into operation.

By turning the crank $a^5$ which drives a cam $f^4$ through the medium of the endless screw $e^3$ or the like, it is then possible to cause this cam $f^4$ to turn through an angle such that it attains the position shown in Figure 10. If the lever $d^3$ be released at this moment the crank $a^3$ can continue to be turned working the two moving parts $a$ and $b$ without the clutches $x^2$ and $x^3$ escaping from the bosses $q^2$ and $q^4$.

In this position, the two coils are short circuited upon each other by the closing of the contact $g^3$ which is mounted in shunt on the interruptors $i^2$ of Figure 6, through the medium of the wires $h^3$, $h^4$ (see Figures 6 and 9).

After a determined number of revolutions of the crank $a^3$, the cam $f^4$ will assume the position of Figure 7, in such a way that it will let the tappet $m^3$ slip abruptly (see the dotted position in Figure 10) and the spring $b^3$ proceeds no less abruptly to draw back the movable frame $c^3$ thus freeing the bosses $q^2$ and $q^4$ and the moving parts $a$ and $b$.

The apparatus must be regulated in such a way that this release is produced in one of the end stroke positions.

It is obvious that when the frame $c^3$ carrying the two tubes $s^2$ and $s^3$ can return backwards and at the precise moment when the clutches $x^2$ $x^3$ are just escaping from the bosses $q^2$ and $q^4$ and the rod $i^3$ will strike against the insulating stud $j^3$ of the contact $g^3$ thus cutting off instantaneously the primary current of one of the coils if one of the interruptors is open at this instant.

The interruptors must therefore be regulated in such a way that at the moment in which the starting apparatus liberates the moving parts and cuts the contact $g^3$ the interruptor corresponding to the side where the compression takes place is already open to produce the first spark for ignition and permit the motor to start instantaneously.

The hydraulic force pumps, which act alternately, deliver the liquid under a variable feed which it is necessary to regulate.

To this end, the combined force pipes N of the pumps $k^1$—$k^8$ leading to the motor are connected with an air vessel, but this is constituted in a peculiar way as shown in Figure 11.

The liquid which enters the air vessel lifts a piston $n^3$, the upper part of which forms a packing flange $o^3$ and the lower part of which slides in the cylindrical part $p^3$ of the vessel $r^3$.

In this way it is possible at the time of a first filling to cause a gas under high pressure to enter the vessel through the opening $s^4$.

This gas lifts the piston $n^3$ and enters the vessel with all its force.

When during operation of the hydraulic force pumps the liquid gains a pressure greater than that of the gas previously introduced into the air vessel, the liquid will enter by the lower opening $u^3$ of the vessel, and compress the gas in the upper part by first raising the piston $n^3$ and continuing to rise until the gas imprisoned has attained the pressure of the liquid.

When the motor stops or for any other cause the pressure in the force pipes drops back the elasticity of the gas will bring back the piston towards the bottom, the edge $o^3$ making a snug joint starting from the moment when it re-enters the cylindrical part $p^3$ and prevents the liquid and the gas which surround it from escaping downwards.

In order that the liquid contained below the piston may not be able to flow, the said piston $n^3$ in descending presses against the upper edge of the opening $v^3$, a spring ($w^3$) pressed valve $v^4$ in such a way that it closes the opening.

In this way the air vessel once it has been charged and put into use, may be preserved an extremely long time without losing its liquid and its gas under pressure.

The motor ought, in the ordinary way, to be cooled, for example by means of a water circulation.

As however there is a very peculiar mode of working, there is no means of applying to it any ordinary system of pump operation.

The system of operation which is described here consists in arranging on one of the bosses which drives the pump pistons (in the preceding case the boss $q'$) a tappet $b^4$ which, in its movement strikes against the rock arm $c^4$ and communicate to it at each impact an oscillatory movement about its axis $d^4$.

The lever $c^4$ is constantly drawn back to its original position by the spring $e^4$.

It will be seen that it is thus possible to drive round by successive movements of the lever $c^4$ a ratchet wheel $g^4$.

It is preferable that in the movement resulting from the impact of the tappet $b^4$ against the lever $c^4$ the pawl passes from one tooth to the other of the ratchet $g^4$ and the driving of this latter only takes place during the return of the lever under the impulse of the spring $e^4$.

If the arrangement were mounted in the reverse direction, it might produce breakages therein.

It is obvious that the system of ratchet described may be advantageously replaced by other equivalent arrangements.

To further diminish the strokes in the driving of the pumps, the ratchet wheel $g^4$ is not connected directly to the axis thereof but is connected by means of a spiral spring $i^4$ Fig. 3 the flexibility of which must be sufficient to ensure the shaft $j^4$ of the pumps not having too varied a movement.

It is also advantageous that the pumps be arranged as in the drawing where those which serve for lubrication ($m^4$), are supposed to be gear wheel pumps and that which serves for cooling a centrifugal pump.

This latter is mounted with a sufficiently high multiplying gear with respect to the shaft $j^4$ by means of a train of gears $o^4$, forms a flywheel and thus facilitates the regularity of rotation of the shaft $j^4$.

In order to ensure the cooling of the piston $a$ the spring $f$ imprisons between each of its ends and the corresponding seats of its support $z^3$ two plates of sheet metal $y^3$ the object of which is to obstruct as much as possible the internal area of the piston $a$.

In this way this latter produces by its movement an active ventilation by suction and expulsion alternately of the air through the slots $a^4$.

It has hereinbefore been stated that the present motor can be directly used to produce electricity.

To this end, the pistons of each pair of hydraulic pumps may be replaced by a movable coil $p^4$ in which circulates a continuous current which is supplied to it as will be explained hereafter (see Figure 12).

This coil $p^4$ moves longitudinally, traversing the fixed coil $r^4$.

The magnetic core $t^4$ of this movable coil is magnetically symmetrical at each end and is driven by the boss $q'$ by means of a non-magnetic rod $u^4$.

It thus happens that when the coil $p^4$ is in its mean position the magnetic flux which it produces traverses entirely the coil $r^4$, while when it is outside, this latter coil is not traversed by any flux. It results herefrom that the movement of the coil $p^4$ traversed by a continuous current, induces in the coil $r^4$ an alternating electro-motive force of a period equal that of the motor.

If it be preferred that the period be equal to that of the motor, it will suffice that the two extreme positions of the coil $p^4$ instead of being both outside the coil $r^4$ are one outside and the other inside the same plane of the said coil.

To supply the current to the induction coil one of its ends may be electrically connected to the rod $u^4$ while the other is connected to an insulated rod $v^{41}$ which receives the current from a suitable rubber $w^4$.

To produce under these circumstances the regulation of the motor it suffices to preserve the part of the arrangement of Figure 2, formed by the rod $i$, the rock arm $w$ the piston $b'$ and the piston $j'$ by simply connecting the admission ball $g'$ to a liquid supply pipe.

Under these conditions it suffices that the piston $j'$ has an extension extending outwards, which acts upon a rheostat of such a kind that the more the piston $b$ pushes the piston $j'$ at the end of its stroke the more this rheostat will reduce the resistance and the more the coil $p^4$ will be traversed by an intense current, developing thus in the coil $r^4$ induced currents likewise very intense absorbing more power and putting a bigger brake upon the motor.

In proportion as the piston $j'$ returns back by the same process which has been described the braking will diminish and it is possible to dispose the rheostat in such a way that at the moment when the piston $j'$ is brought back to its other end of the stroke by the spring $m'$ there shall be a total cutting off of the inducing current which traverses $r^4$.

It is obvious that if it be desired to economize the inducing current, the rheostat may be replaced by a suitable coupling apparatus, the coil $p^4$ being then divided into a suitable number of sections connected at the outside by as many rods like $v^{41}$ as there are sections.

I claim—

1. In a prime mover the combination of a fixed cylinder, a reciprocable cylinder in said fixed cylinder, said reciprocable cylinder being headed at both ends, a piston in said reciprocable cylinder, valves in both ends of the reciprocable cylinder to provide for the admission of explosive charges between said piston and the opposite heads of said reciprocable cylinder in alternation, and means to explode charges at the opposite ends of said piston in alternation whereby the piston and reciprocable cylinder are alternately driven in opposite directions.

2. In a prime mover the combination of a fixed cylinder, a reciprocable cylinder in said fixed cylinder, said reciprocable cylinder being headed at both ends, a movable piston in said reciprocable cylinder, valves in both ends of said reciprocable cylinder, the movement of the reciprocable cylinder in either direction causing the introduction of an explosive charge between one of the heads of the reciprocable cylinder and the adjacent head of the fixed cylinder, and the movement of the reciprocable cylinder in the opposite direction causing said valves to permit the admission of said charge into the interior of the reciprocable cylinder.

3. In a prime mover, the combination of a fixed cylinder, movable actuating elements in said cylinder, pumps, pistons in the pumps connected to the actuating elements, counter-pistons forming pump heads for each of the pumps and means operated by said actuating elements to regulate the position of said heads to vary the quantity of fluid delivered by the pumps.

4. In a prime mover, the combination of a cylinder, movable actuating elements in said cylinder, pumps, pistons in the pumps directly connected to the actuating elements, counter-pistons, and fluid means operated by the actuating elements when the latter have exceeded their normal stroke to regulate the position of the counter-pistons so that the quantity of liquid delivered by the pumps is adjusted.

5. In a prime mover, the combination of a fixed cylinder, a reciprocable cylinder in said fixed cylinder, a movable piston having a ventilating opening in said reciprocable cylinder, a support carrying a spring secured to the fixed cylinder and projecting into the piston, the support creating a draft through the ventilating opening of the piston when the latter is moved.

6. In a prime mover, the combination of a fixed cylinder, a reciprocable cylinder in said fixed cylinder, a piston having a ventilating opening in said reciprocable cylinder, a tubular support having open ends, plates closing the openings of said ends, and a spring in said support to maintain the plates in position, the plates being adapted to limit the movement of said piston, the support being substantially co-extensive with the interior of said piston, whereby a draft through said ventilating opening is created when the piston is in motion.

7. In a prime mover the combination of actuating elements, the strokes of said elements being variable to suit different conditions of power transmission, pumps connected to the actuating elements, secondary pumps co-operating with each of said pumps and operating means between the secondary pumps and the actuating elements to regulate the quantity of fluid delivered by said pumps in accordance with the deviation of the stroke of the actuating elements from the normal.

8. In a starting device for prime movers of the character described, the combination of members secured to the reciprocating parts of the prime mover, elements adapted to engage said members, the elements being normally out of engagement with said members, a manually operable rotatable actuating member, and means actuated by said actuating member to cause said elements and members to engage and impart motion to the members of the prime mover in opposite directions when the manually operable actuating member has been rotated a predetermined number of times.

9. In a starting device for prime movers of the character described, the combination of members secured to the reciprocating parts of a prime mover, elements adapted to engage said members, the elements being slidably mounted and resiliently maintained in such position that the elements and members are disengaged, a manually operable rotatable member and means actuated by said manually operable member to cause said elements and members to engage and to impart motion to the members of the prime mover in opposite directions, when the manually operable actuating member has been rotated a predetermined number of times.

In witness whereof, I have hereunto signed my name in the presence of two subscribing witnesses.

ROBERT ESNAULT-PELTERIE.

Witnesses:
 CHAS. P. PRESSLY,
 HENRI CARTIER.